(12) United States Patent
Merrett

(10) Patent No.: US 7,604,003 B2
(45) Date of Patent: Oct. 20, 2009

(54) SOLAR PANEL

(75) Inventor: Stephen Lawrence Merrett, Ulladulla (AU)

(73) Assignee: Autumn Solar Installations Pty Limited, Ulladulla NSW (AU)

( * ) Notice: Subject to any disclaimer, the term of this patent is extended or adjusted under 35 U.S.C. 154(b) by 0 days.

(21) Appl. No.: 11/975,270

(22) Filed: Oct. 17, 2007

(65) Prior Publication Data

US 2009/0101134 A1    Apr. 23, 2009

(51) Int. Cl.
*F24J 2/42* (2006.01)
(52) U.S. Cl. .................. 126/563; 126/632; 126/651; 126/663; 126/704
(58) Field of Classification Search ............ 126/563, 126/651, 660, 661, 663, 704, 705, 706, 707, 126/708, 709, 632; 285/19, 20, 24, 27
See application file for complete search history.

(56) References Cited

U.S. PATENT DOCUMENTS

| | | | | |
|---|---|---|---|---|
| 2,274,492 A * | 2/1942 | Modine | ................... | 126/658 |
| 2,738,992 A * | 3/1956 | Heisler | ................... | 285/113 |
| 3,898,979 A * | 8/1975 | Medico, Jr. | ................... | 126/662 |
| 3,937,208 A * | 2/1976 | Katz et al. | ................... | 126/665 |
| 4,033,327 A * | 7/1977 | Pei | ................... | 126/608 |
| 4,066,063 A * | 1/1978 | Gross et al. | ................... | 126/665 |
| 4,069,811 A * | 1/1978 | Tabor | ................... | 126/655 |
| 4,098,259 A * | 7/1978 | Barber et al. | ................... | 126/661 |
| 4,102,726 A * | 7/1978 | Brackman | ................... | 156/244.11 |
| 4,201,190 A * | 5/1980 | Bowen | ................... | 126/704 |
| 4,206,748 A * | 6/1980 | Goodman et al. | ................... | 126/668 |
| 4,211,213 A * | 7/1980 | Nissen et al. | ................... | 126/563 |
| 4,216,764 A * | 8/1980 | Clark | ................... | 126/663 |
| 4,217,887 A * | 8/1980 | Hoffman et al. | ................... | 126/664 |
| 4,224,928 A * | 9/1980 | Werner et al. | ................... | 126/705 |
| 4,267,822 A * | 5/1981 | Diamond | ................... | 126/587 |
| 4,269,172 A * | 5/1981 | Parker et al. | ................... | 126/621 |
| 4,278,070 A * | 7/1981 | Bowen | ................... | 126/704 |
| 4,278,076 A * | 7/1981 | Hopper | ................... | 126/704 |
| 4,280,477 A * | 7/1981 | Divine | ................... | 126/563 |
| 4,287,883 A * | 9/1981 | Kyrias | ................... | 126/669 |
| 4,292,958 A * | 10/1981 | Lee | ................... | 126/664 |
| 4,321,911 A * | 3/1982 | Offutt | ................... | 126/663 |
| 4,361,134 A * | 11/1982 | Bowen | ................... | 126/705 |
| 4,407,269 A * | 10/1983 | Hopper | ................... | 126/634 |
| 4,471,764 A * | 9/1984 | Calvert et al. | ................... | 126/704 |
| 4,498,265 A * | 2/1985 | Leflar et al. | ................... | 52/204.591 |
| 4,535,756 A * | 8/1985 | Rinehart et al. | ................... | 126/710 |
| 4,674,477 A * | 6/1987 | Tabor | ................... | 126/652 |
| 5,333,602 A * | 8/1994 | Huang | ................... | 126/608 |
| 5,472,324 A * | 12/1995 | Atwater | ................... | 417/423.8 |

(Continued)

FOREIGN PATENT DOCUMENTS

GB    2099984  A  *  12/1982

*Primary Examiner*—Kenneth B Rinehart
*Assistant Examiner*—Jorge Pereiro
(74) *Attorney, Agent, or Firm*—Abelman, Frayne & Schwab

(57) ABSTRACT

A solar panel (10) has tubing (12) through which water from a swimming pool is recirculated. The tubing (12) is adapted to be exposed to the sun for heating the water to a temperature whereby the pool is heated. The solar panel (10) has a housing (14) for the tubing (12), and the housing (14) has a transparent screen (16) covering the tubing (12). In use, the housing (14) retains heat therewithin for increasing the temperature of the tubing (12) above that outside of the housing.

12 Claims, 6 Drawing Sheets

U.S. PATENT DOCUMENTS 5,572,988 A * 11/1996 Walton ................... 126/652
5,596,981 A *  1/1997 Soucy ................... 126/704
5,960,790 A * 10/1999 Rich .................... 126/623
2004/0255932 A1* 12/2004 Nocera .................. 126/634

* cited by examiner

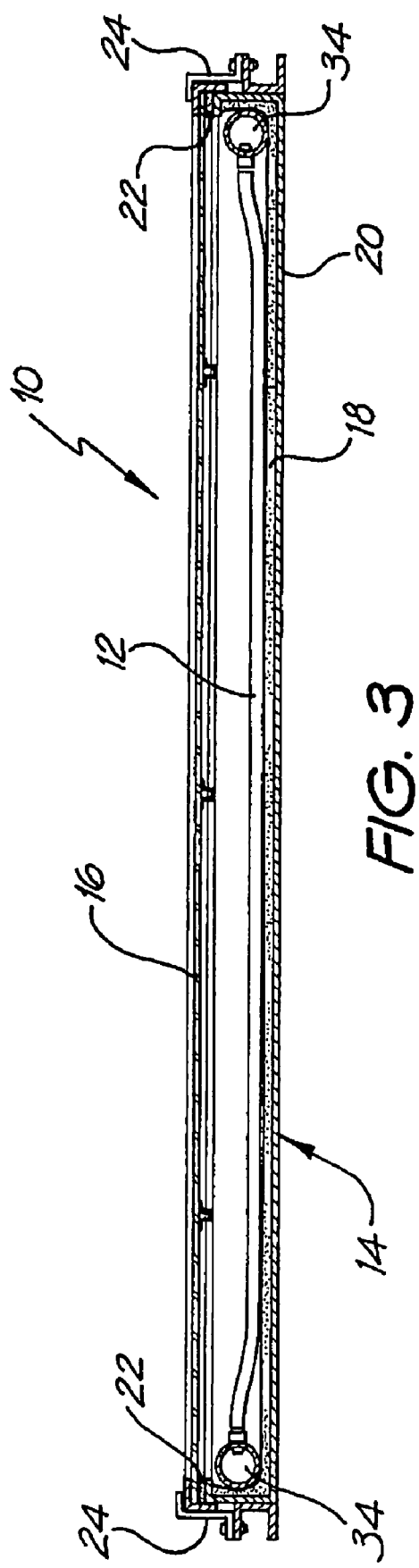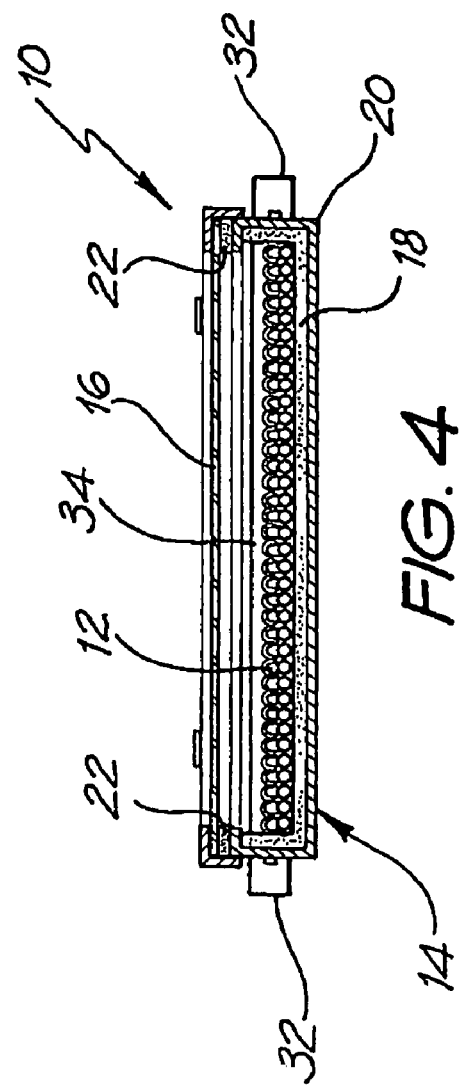

SOLAR PANEL

FIELD OF THE INVENTION

The present invention relates to solar panels and, in particular, to an insulated solar panel for supplying heated, recirculated water to a swimming pool.

BACKGROUND OF THE INVENTION

Swimming pools may be heated by recirculating pool water through one or more solar panels made of black rubber tubing or the like laid on a roof and exposed to the sun and other elements. Rubber and, to a lesser extent, plastic are the materials of choice for the tubing as they are resistant to corrosion by salt carried in the pool water and, unlike copper tubing, do not leave a stain in the pool. However, in order to effectively heat an average pool, the surface area of solar paneling required should, according to Australian Standards, be 70% of the total surface area of the pool. For instance, if an average pool has a surface area of 40 m$^2$, then the surface area of solar paneling required to be installed on a roof will be 28 m$^2$. This is a relatively large proportion of the roof devoted to supporting solar paneling for a pool, and may be unsightly and problematic to maintain. Furthermore, such a large surface area of solar paneling, being exposed to the elements, may deteriorate over time and, particularly where the solar paneling is made of rubber, is a target for cockatoos and some other birds who enjoy pecking at, or even eating, the rubber material. Still further, the exposed solar paneling may be subject to the cooling effects of wind or frost, thereby prolonging the time required for the water recirculating through the tubing to attain the desired temperature.

SUMMARY OF THE INVENTION

It is, therefore, an object of the present invention to overcome, or at least substantially ameliorate, the shortcomings and disadvantages of the prior art.

According to the invention, there is provided a solar panel comprising tubing through which water from a swimming pool is recirculated, the tubing being adapted to be exposed to the sun for heating the water to a temperature whereby the pool is heated, and a housing for the tubing, the housing having a transparent screen covering the tubing, the arrangement being such that the housing retains heat therewithin for increasing the temperature of the tubing above that outside the housing.

Preferably, the solar panel further includes a tubular member having a header portion and opposed end portions, the header portion being located within the housing and each end portion protruding outwardly from a respective side wall of the solar panel so as to define an opening at the side wall, the end portions being in liquid flow communication with the header portion, and the header portion being in liquid flow communication with the tubing so that heated, recirculating water passing through the tubing may exit the solar panel through a first said opening and unheated, recirculating water passing through a second said opening may enter the solar panel for heating.

It is preferred that the solar panel further includes a key extending outwardly from each end portion and a key way formed continuously with a hole in a respective side wall through which the tubular member passes, the key being engaged within the key way.

In a preferred form, the solar panel further includes a circlip which is removably located circumferentially around each end portion so as to space apart a barrel union from the respective side wall, the barrel union being adapted to engage the end portion.

The transparent screen is preferably made of clear acrylic or toughened glass.

The solar panel preferably includes insulating material located within the housing and upon which the tubing is supported.

The tubing may be made of EPDM rubber or PVC plastic.

According to another aspect of the invention, there is provided a solar panel assembly for a roof comprising a plurality of the solar panels described above, each one of the solar panels having a barrel union fitted thereto for allowing recirculating water to pass from the tubing in one solar panel to the tubing in an adjacent solar panel.

SUMMARY OF THE DRAWINGS

FIG. 3 is a sectional side view through III-III of the solar panel shown in FIG. 2.

FIG. 4 is a sectional end view through IV-IV of the solar panel shown in FIG. 2.

DETAILED DESCRIPTION OF PREFERRED EMBODIMENTS OF INVENTION

Figure 1:
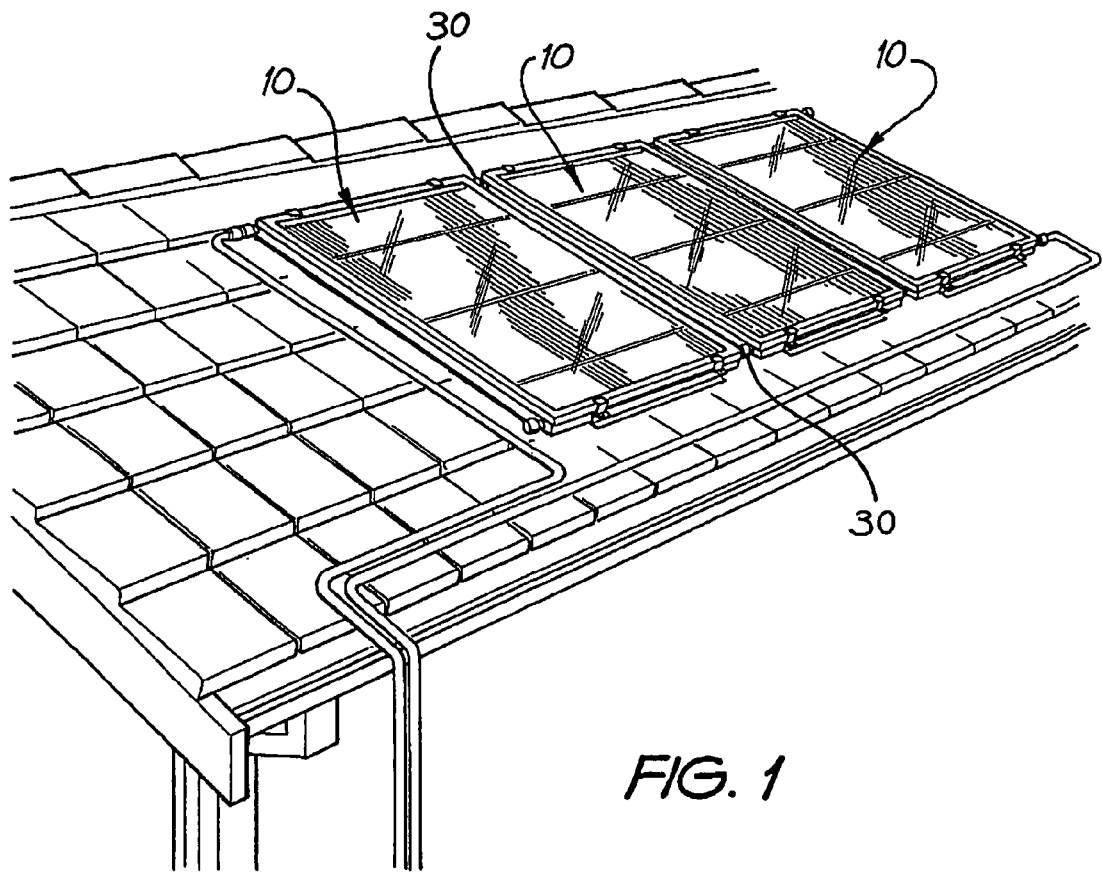
FIG. 1 is a perspective view of an assembly of solar panels according to a preferred embodiment of the invention mounted to a roof.
Figure 2:
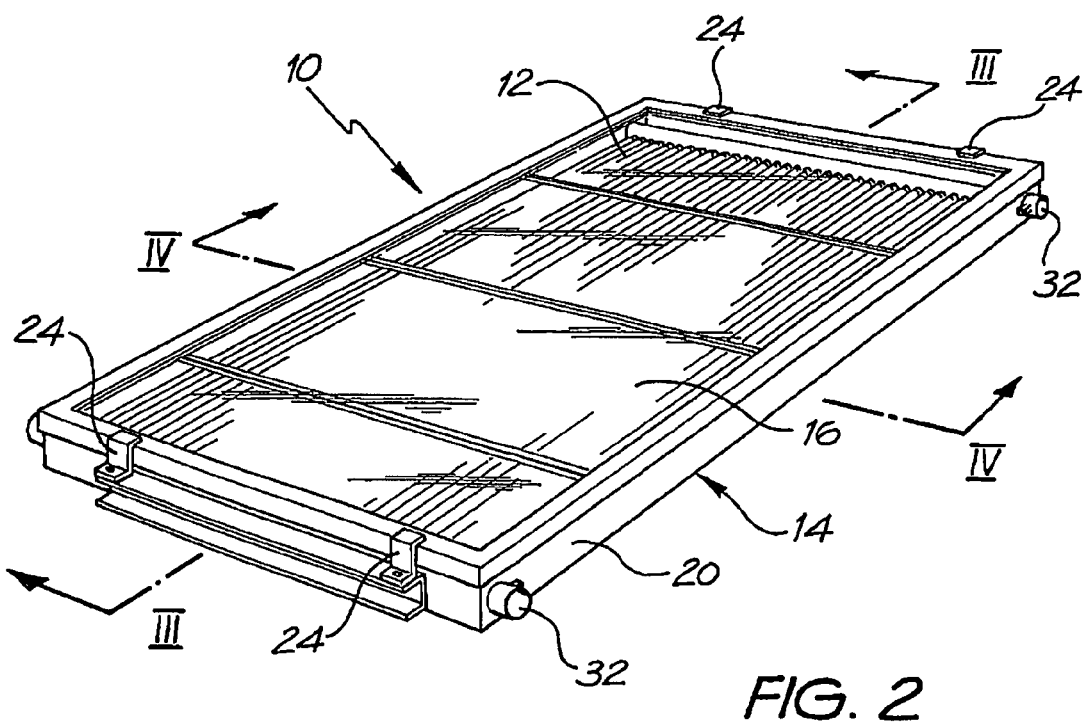
FIG. 2 is a perspective view of an isolated solar panel from the assembly shown in FIG. 1.

The solar panel 10 shown isolated or as part of an assembly of solar panels in FIGS. 1 to 6 includes ethylene propylene diene (EPDM) rubber tubing 12 (although polyvinylchloride (PVC) plastic tubing may alternatively be used) formed as a mat and providing a passageway for recirculating water from a swimming pool that is desired to be heated by heat radiating from the sun and impacting on the solar panel when mounted on a roof.

The tubing 12 is surrounded by a housing 14. The housing 14 includes, in this embodiment, a transparent screen 16 covering the tubing 12, and which is made of clear acrylic (although toughened glass may alternatively be used).

The solar panel includes insulating material 18 located within the housing 14 (see especially FIG. 5) and upon which the tubing 12 is supported.

The housing 14 further includes an aluminium tray 20 (although a polypropylene tray may alternatively be used) upon which the insulating material 18 is supported, and a rubber seal 22 between the transparent screen 16 and the tray 20. Rubber straps are used to press the tubing 12 against the insulating material 18 without causing any blockage of the recirculating water passageway.

A set of aluminium clamps 24 are used to clamp together the transparent screen 16 and the tray 20 along the rubber seal 22.

Figure 6:
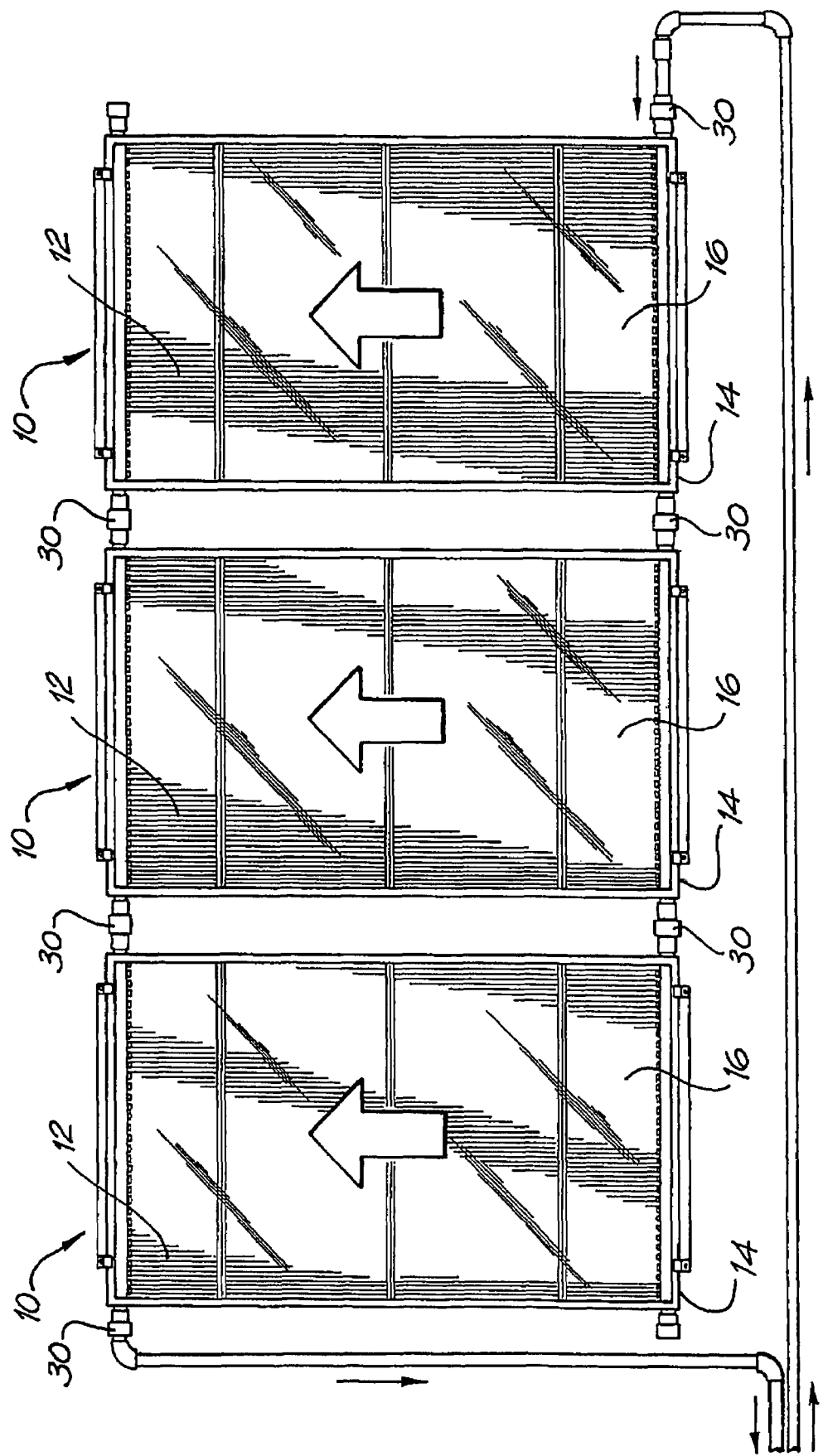
FIG. 6 is a top view of the solar panel assembly shown in FIG. 1 illustrating the direction of flow of recirculating water.

A plurality of the solar panels 10 are interconnected to form an assembly of solar panels which are mounted to a roof as shown in FIGS. 1 and 6. The solar panels 10 are laid side by side on the roof and are interconnected by a modular connection pipe 30 fitted between openings 32 at respective side walls of adjacent panels. In this embodiment, each opening 32 is defined by an end portion of a respective tubular member 34 that protrudes outwardly from its respective side wall, the protruding end portion being in liquid flow communication with a header portion of the tubular member 34 located within the housing 14. Connected to each header portion, via suitable fittings, is the tubing 12, so that heated, recirculating water passing through the tubing may exit the solar panel through the openings 32, and unheated, recirculating water passing through the openings 32 may enter the solar panel for heating.

Each modular connection pipe 30, also referred to as a barrel union, has an end suited to engaging a respective end portion defining an opening 32 of a solar panel 10. Engagement is facilitated by rubber sealing means and a tight interference fit between inter-engaging male and female contact surfaces of each end.

Figure 5:
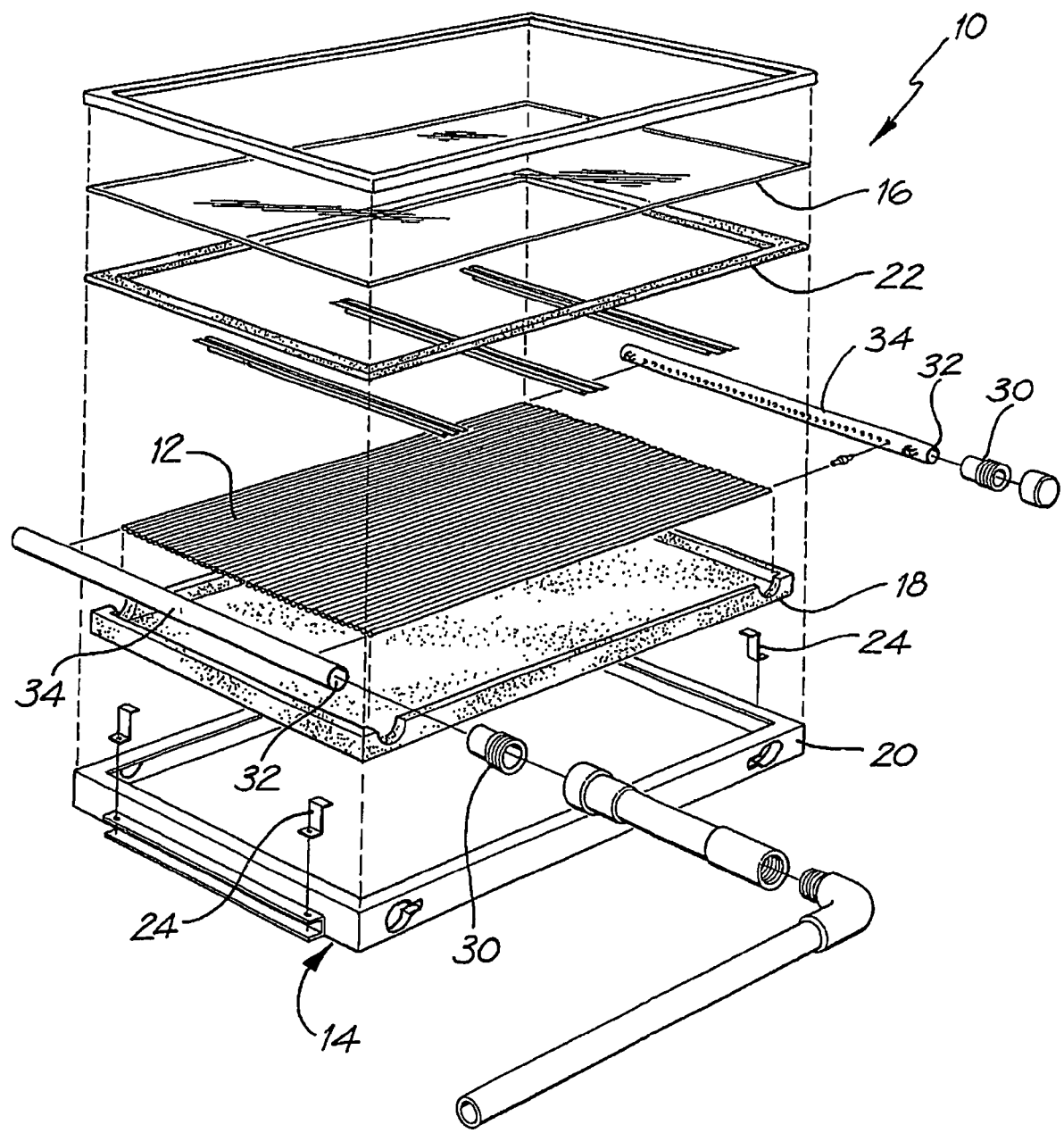
FIG. 5 is an exploded perspective view of the solar panel shown in FIG. 2 and external tubing therefor.
Figure 7:
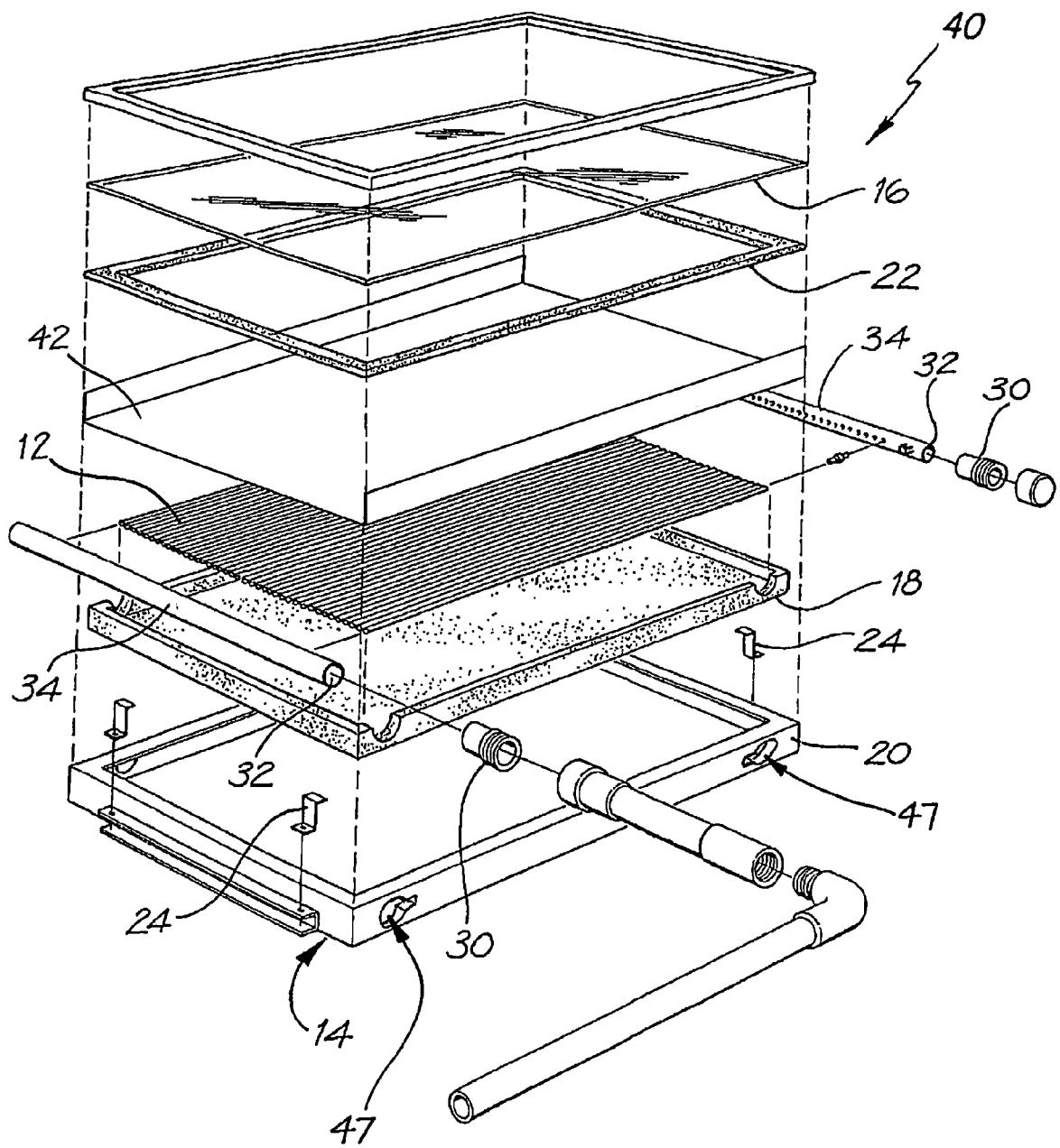
FIG. 7 is an exploded perspective view of a solar panel according to another preferred embodiment of the invention and external tubing therefor.

The solar panel 40 shown (in exploded form) in FIG. 7 differs from the solar panel 10 shown in FIG. 5 by having an aluminium panel 42 in place of the rubber straps to press the tubing 12 against the insulating material 18. The aluminium panel 42 serves as a heat sink for absorbing heat from the sun and conducting it directly onto the rubber tubing 12 upon which it is laid for heating the water recirculating therethrough. Direct contact between the aluminium heat sink panel 42, which has a black coating applied to its upper surface to improve heat absorption, and the rubber tubing 12 greatly increases the water heating capacity of the solar panel 40, and also protects the tubing 12 against UV damage. The aluminium heat sink panel 42 has opposed upturned sides that abut against the inner surface of the side walls of the insulating material 18.

Without being limited thereto, the approximate dimensions of the solar panels 10 and 40 are 600 mm in width (or end dimension), 2 metres in length (or side dimension), and 70 mm in height. The insulated, protected environment for the tubing 12 created by the housing 14 allows the ambient air temperature therewithin to be between about 10° C. and 15° C. higher than the ambient air temperature immediately surrounding the tubing that is exposed to the elements when water is circulating through the tubing 12. This provides the advantage that, whereas the surface area of exposed solar panels necessary on a roof to achieve effective heating according to the Australian Standard of an average pool is 28 m$^2$, the surface area of insulated, protected solar panels according to this invention for the same purpose is 14 m$^2$, which is 50% of the recommended coverage according to the Australian Standard, being a saving of an area of 14 m$^2$ of roof space, and thus requiring fewer solar panels to be used.

Figure 8:
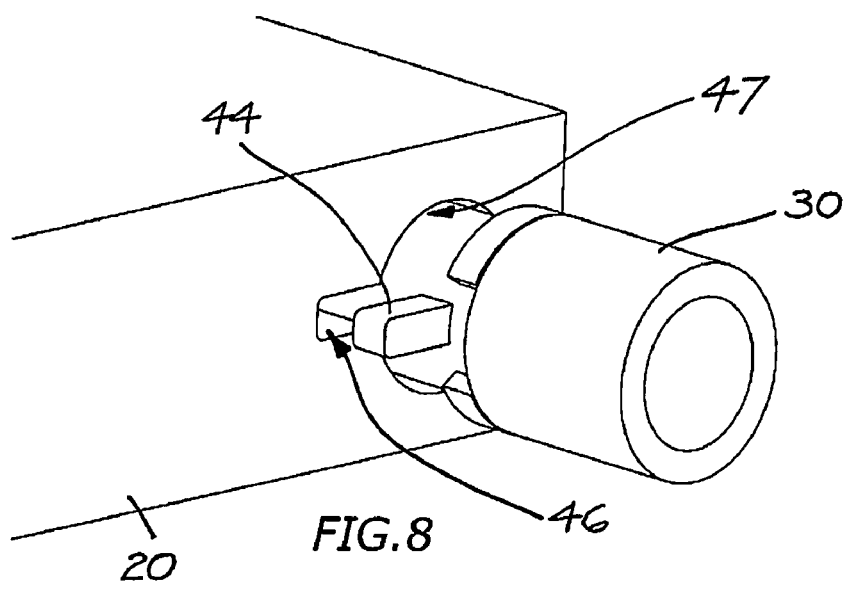
FIG. 8 is a perspective view of a cooperating arrangement at a corner region of the solar panel of FIG. 2 or FIG. 5 at a first stage of assembly.
Figure 9:
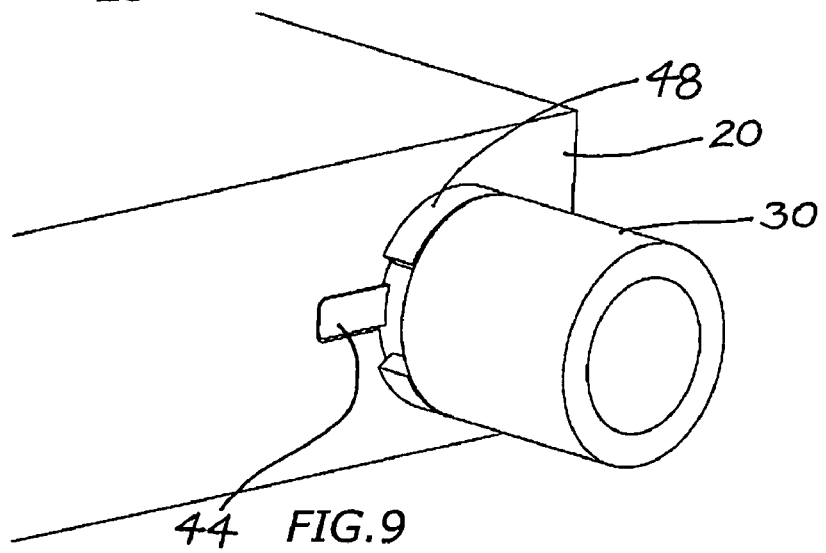
FIG. 9 is a perspective view similar to that of FIG. 8 but showing the cooperating arrangement at a second stage of assembly.
Figure 10:
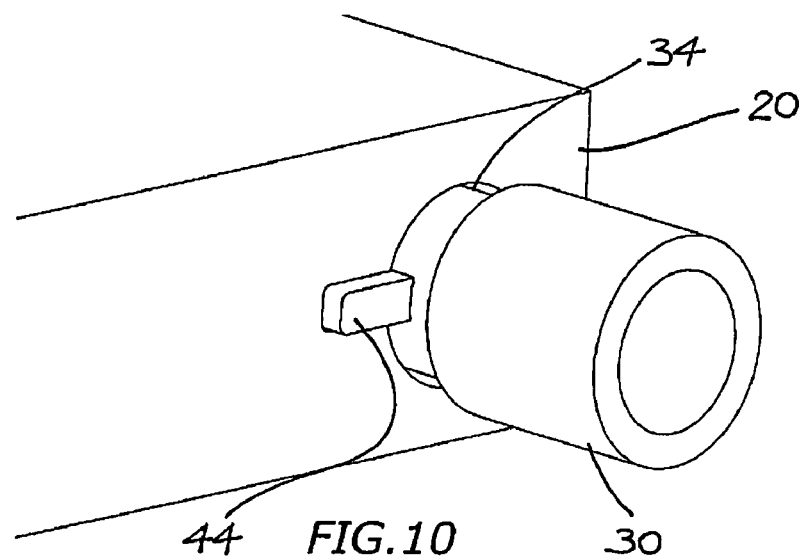
FIG. 10 is a perspective view similar to that of FIGS. 8 and 9 but showing the location of the key and key way of the cooperating arrangement after installation and when the tubular member of the solar panel has expanded due to extreme heat.

FIGS. 8, 9 and 10 show a cooperating arrangement at any one of the four corner regions of the solar panel 10 of FIG. 5 or of the solar panel 40 of FIG. 7.

The cooperating arrangement includes a key 44 extending outwardly from the protruding end portion of the tubular member 34, and a key way 46 formed continuously with a hole 47 in the side wall of the tray 20 through which the tubular member 34 passes. There are four such arrangements adjacent the respective four corners of each solar panel in an assembly.

In assembling the solar panel, the key 44 is fitted or engaged into the key way 46 and the barrel union 30 is screwed onto the end portion of the tubular member 34 where the opening 32 is located. Keying the location of the tubular member 34 relative to the tray 20 during this stage of assembly ensures that no misalignment arises (as can often result from an unrestrained screwing motion that inappropriately twists the tubular member) between the tubular member 34 and the tubing 12 across the fittings, which might weaken the tubing or impede the recirculation or flow of water therethrough, or cause other damage.

Also during this stage of assembly, a removable plastic circlip 48 is located circumferentially around the protruding end portion of the tubular member 34 so that the circlip 48 abuts, on one side, against the side wall of the tray 20 and, on the other side, against the barrel union 30. The predetermined width of the circlip 48 ensures that the barrel union 30 is suitably spaced apart from the side wall of the tray 20 when the key 44 is fitted into the key way 46, as shown in FIG. 9. All four circlips 48 are removed from their respective corner regions of the solar panels 10, 40 after installation.

The use of the circlip 48 ensures that the barrel union 30 is connected to the protruding end portion of the tubular member 34 far enough away from the side wall of the tray 20 that, during the contraction of the tubular member 34 under extreme cold, the barrel union 30 will not be drawn toward and then press against the tray side wall. If this were allowed to occur, the barrel union may crack under the extreme pressure it may experience, and other damage may occur.

The engagement of the key 44 within the key way 46 also facilitates the expansion and contraction of the tubular member 34 and of the external tubing under the influence of extreme weather conditions so as to prevent damage occurring to the operation of the solar panel. During a period of extreme heat, the tubular member 34 will expand and the key 44 will slide out of the key way 46, as shown in FIG. 10, whilst during a period of extreme cold, the tubular member 34 will contract and the key 44 will slide into the key way 46 but never so far as to allow the barrel union 30 to collide against the tray side wall, where damage may occur.

It will be apparent to persons skilled in the art that various modifications may be made in details of design and construction of the solar panel and of the assembly of solar panels described above without departing from the scope and ambit of the invention.

The invention claimed is:

1. A solar panel comprising tubing through which water from a swimming pool is recirculated, the tubing being adapted to be exposed to the sun for heating the water to a temperature whereby the pool is heated, and a housing for the tubing, the housing have a transparent screen covering the tubing, the arrangement being such that the housing retains heat therewithin for increasing the temperature of the tubing above that outside the housing;

a tubular member having a header portion and opposed end portions, the header portion being located with the housing and each end portion protruding outwardly from a respective side wall of the housing so as to define an opening at the side wall, the end portions being in liquid flow communication with the header portion, and the header portion being in liquid flow communication with the tubing so that heated, recirculating water passing through the tubing exits the solar panel through one of the end portions, and unheated, recirculating water passing through the opposed end portion enters the solar panel for heating;

a key extending outwardly from each end portion and a key way formed continuously with a hole in a respective side wall through which the tubular member passes, the key being engaged within the key way; and a circlip which is removably located circumferentially around each end portion so as to space apart a barrel union from the respective side wall, the barrel union being adapted to engage the end portion.

2. The solar panel according to claim 1, further including insulating material located within the housing and upon which the tubing is supported.

3. The solar panel according to claim 2 further including a tray upon which the insulating material is supported.

4. The solar panel according to claim 3 further including a rubber seal between the transparent screen and the tray, and clamps for clamping the transparent screen and the tray together along the rubber seal.

5. A solar panel assembly for a roof comprising a plurality of the solar panels according to claim 4, each one of the solar panels having a barrel union fitted thereto for allowing recirculating water to pass from the tubing in one solar panel to the tubing in an adjacent solar panel.

6. A solar panel assembly for a roof comprising a plurality of the solar panels according to claim 3, each one of the solar panels having a barrel union fitted thereto for allowing recirculating water to pass from the tubing in one solar panel to the tubing in an adjacent solar panel.

7. A solar panel assembly for a roof comprising a plurality of the solar panels according to claim 2, each one of the solar panels having a barrel union fitted thereto for allowing recirculating water to pass from the tubing in one solar panel to the tubing in an adjacent solar panel.

8. The solar panel according to claim 1 wherein the transparent screen is made of clear acrylic or toughened glass.

9. A solar panel assembly for a roof comprising a plurality of the solar panels according to claim 8, each one of the solar panels having a barrel union fitted thereto for allowing recirculating water to pass from the tubing in one solar panel to the tubing in an adjacent solar panel.

10. The solar panel according to claim 1 wherein the tubing is made of ethylene propylene diene rubber or polyvinylchloride plastic.

11. A solar panel assembly for a roof comprising a plurality of the solar panels according to claim 10, each one of the solar panels having a barrel union fitted thereto for allowing recirculating water to pass from the tubing in one solar panel to the tubing in an adjacent solar panel.

12. A solar panel assembly for a roof comprising a plurality of the solar panels according to claim 1, each one of the solar panels having a barrel union fitted thereto for allowing recirculating water to pass from the tubing in one solar panel to the tubing in an adjacent solar panel.

* * * * *